(12) United States Patent
Brown et al.

(10) Patent No.: US 6,470,324 B1
(45) Date of Patent: Oct. 22, 2002

(54) DEALER INVENTORY MANAGEMENT SYSTEM

(75) Inventors: Trevor A. Brown, West Bloomfield; John M. Troha, Ortonville; David M. Wolenberg, Auburn Hills; Paul L. Berrigan, Jr., Farmington Hills, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/253,477

(22) Filed: Feb. 19, 1999

(51) Int. Cl.[7] .............................................. G06F 17/60
(52) U.S. Cl. ............................................ 705/28; 705/8
(58) Field of Search ............................... 705/28, 22, 7, 705/8, 10

(56) References Cited

U.S. PATENT DOCUMENTS

| | | | |
|---|---|---|---|
| 4,783,740 A | | 11/1988 | Ishizawa et al. |
| 4,887,208 A | | 12/1989 | Schneider et al. |
| 5,216,594 A | | 6/1993 | White et al. |
| 5,299,115 A | | 3/1994 | Fields et al. |
| 5,315,509 A | | 5/1994 | Natarajan |
| 5,381,517 A | * | 1/1995 | Thorndike et al. ............ 395/61 |
| 5,450,317 A | * | 9/1995 | Lu et al. ..................... 364/402 |
| 5,461,699 A | * | 10/1995 | Arbabi et al. ................. 395/23 |
| 5,570,291 A | | 10/1996 | Dudle et al. |
| 5,712,985 A | | 1/1998 | Lee et al. |
| 5,764,543 A | * | 6/1998 | Kennedy ..................... 364/578 |
| 5,765,143 A | | 6/1998 | Sheldon et al. |
| 5,771,172 A | | 6/1998 | Yamamoto et al. |
| 5,953,707 A | * | 9/1999 | Huang et al. .................. 705/10 |
| 6,032,125 A | * | 2/2000 | Ando .......................... 705/10 |
| 6,119,933 A | * | 9/2000 | Wong et al. ................. 235/380 |
| 6,151,582 A | * | 11/2000 | Huang et al. ................... 705/8 |
| 6,167,380 A | * | 12/2000 | Kennedy et al. .............. 705/10 |
| 6,321,207 B1 | * | 11/2001 | Ye ................................ 705/8 |
| 6,341,269 B1 | * | 1/2002 | Dulaney et al. .............. 705/22 |
| 6,351,734 B1 | * | 2/2002 | Lautzenheiser et al. ........ 705/8 |

FOREIGN PATENT DOCUMENTS

| | | | | |
|---|---|---|---|---|
| JP | 63-180452 | * | 7/1988 | ................... 705/8 |
| JP | 11007482 | * | 1/1999 | ................... 705/28 |
| SU | 1443007 | * | 12/1988 | ................... 705/8 |

OTHER PUBLICATIONS

Bohn, Back on Track: Lumina gains fleet ground despite Taurus push.*

* cited by examiner

Primary Examiner—Robert P. Olszewski
Assistant Examiner—Michael Cuff
(74) Attorney, Agent, or Firm—Ralph E. Smith (57) ABSTRACT

A dealer inventory management system is provided for recommending which types of vehicles a dealer should order from the automotive manufacturer. The computer-implemented system includes a vehicle sales data structure for storing vehicle sales information, a dealer data structure for storing dealer information, and a vehicle availability data structure for storing which vehicles are available to each dealer. A market determination module accesses the vehicle sales and dealer data structures to determine an ideal sales mix of vehicles for each dealer based upon a sampling of vehicle sales made in the dealer's local market. A dealer assessment module then accesses the vehicle availability data structure to formulate a recommended order for each dealer by comparing the dealer's ideal sales mix to the mix of vehicles available to that dealer.

12 Claims, 14 Drawing Sheets

| PREFERRED EQUIPMENT PACKAGES | | IDEAL MIX | DLR STOCK | DLR ORDS | DLR AVAIL | AVAIL MIX |
|---|---|---|---|---|---|---|
| NSKH53 | 28D | 23.9% | 13 | 35 | 48 | 17.8% |
| NSKL52 | 24T | 18.0% |  | 35 | 35 | 13.0% |
| NSKH53 | 28E | 14.5% | 42 | 5 | 47 | 17.4% |
| NSKP53 | 29M | 8.0% | 17 | 12 | 29 | 10.7% |
| NSKP53 | 29K | 7.5% | 20 | 6 | 26 | 9.6% |
| NSKL52 | 22T | 6.4% | 6 | 10 | 16 | 5.9% |
| NSKH52 | 28E | 4.5% | 26 |  | 26 | 9.6% |
| NSKH52 | 28D | 4.0% | 2 |  | 2 | 0.7% |
| OTHER | | 13.4% | 33 | 8 | 41 | 15.2% |
| TOTAL | | 100.0% | 159 | 111 | 270 | 100% |

FIG. 4

| PREFERRED EQUIPMENT PACKAGES | | IDEAL MIX | DLR STOCK | DLR ORDS | DLR AVAIL | AVAIL MIX | VAR IDEAL | ALC #1 | DLR AVAIL | REVISED AVAIL MIX | VAR IDEAL | ALC #2 |
|---|---|---|---|---|---|---|---|---|---|---|---|---|
| NSKH53 | 28D | 23.9% | 13 | 35 | 48 | 17.8% | -6.1% | 1 | 49 | 18.1% | -5.8% | 1 |
| NSKL52 | 24T | 18.0% |  | 35 | 35 | 13.0% | -5.0% |  | 35 | 12.9% | -5.1% |  |
| NSKH53 | 28E | 14.5% | 42 | 5 | 47 | 17.4% | 2.9% |  | 47 | 17.3% | 2.9% |  |
| NSKP53 | 29M | 8.0% | 17 | 12 | 29 | 10.7% | 2.8% |  | 29 | 10.7% | 2.7% |  |
| NSKP53 | 29K | 7.5% | 20 | 6 | 26 | 9.6% | 2.2% |  | 26 | 9.6% | 2.1% |  |
| NSKL52 | 22T | 6.4% | 6 | 10 | 16 | 5.9% | -0.5% |  | 16 | 5.9% | -0.5% |  |
| NSKH52 | 28E | 4.5% | 26 |  | 26 | 9.6% | 5.2% |  | 26 | 9.6% | 5.1% |  |
| NSKH52 | 28D | 4.0% | 2 |  | 2 | 0.7% | -3.2% |  | 2 | 0.7% | -3.2% |  |
| OTHER |  | 13.4% | 33 | 8 | 41 | 15.2% | 1.8% |  | 41 | 15.1% | 1.7% |  |
| TOTAL |  | 100.0% | 159 | 111 | 270 | 100% |  |  | 271 | 100 |  |  |

FIG. 5

| PREFERRED EQUIPMENT PACKAGES | | #1 | #2 | #3 | #4 | #5 | #6 | #7 | #8 | #9 | #10 | #11 | #12 | #13 | #14 | #15 | #16 | #17 | #18 | #19 | #20 | #21 | TOTAL |
|---|---|---|---|---|---|---|---|---|---|---|---|---|---|---|---|---|---|---|---|---|---|---|---|
| NSKH53 | 28D | 1 | 1 | 1 | 1 |   | 1 |   | 1 | 1 | 1 |   |   |   | 1 |   | 1 |   | 1 | 1 |   |   | 12 |
| NSKL52 | 24T |   |   |   |   | 1 |   | 1 |   |   |   | 1 | 1 | 1 |   | 1 |   | 1 |   |   | 1 |   | 8 |
| NSKH53 | 28E |   |   |   |   |   |   |   |   |   |   |   |   |   |   |   |   |   |   |   |   |   |   |
| NSKP53 | 29M |   |   |   |   |   |   |   |   |   |   |   |   |   |   |   |   |   |   |   |   |   |   |
| NSKP53 | 29K |   |   |   |   |   |   |   |   |   |   |   |   |   |   |   |   |   |   |   |   |   |   |
| NSKL52 | 22T |   |   |   |   |   |   |   |   |   |   |   |   |   |   |   |   |   |   |   |   |   |   |
| NSKH52 | 28E |   |   |   |   |   |   |   |   |   |   |   |   |   |   |   |   |   |   |   |   | 1 | 1 |
| NSKH52 | 28D |   |   |   |   |   |   |   |   |   |   |   |   |   |   |   |   |   |   |   |   |   |   |
| OTHER |   |   |   |   |   |   |   |   |   |   |   |   |   |   |   |   |   |   |   |   |   |   |   |
| TOTAL |   |   |   |   |   |   |   |   |   |   |   |   |   |   |   |   |   |   |   |   |   |   | 21 |

FIG. 6

| OPTIONAL EQUIPMENT COMBINATIONS | IDEAL MIX | DLR STOCK | DLR ORDS | DLR AVAIL | AVAIL MIX |
|---|---|---|---|---|---|
| AAB CYN GFA GKD RAS | 20.9% | | | | |
| AAB CYS GFA GKD MWG RAS | 10.7% | 1 | | 1 | 2.1% |
| AAB CYN GFA GKD MWG RAS | 6.6% | | | | |
| AAB AWS CYN GFA GKD MWG RBN | 4.1% | 1 | | 1 | 2.1% |
| AAB AWS CYS GFA GKD MWG RAZ | 3.6% | 2 | 10 | 12 | 25.0% |
| AAB AWS CYS GFA GKD MWG RBN | 3.1% | 4 | 10 | 14 | 29.2% |
| AAB CYR GFA GKD RBN | 3.1% | | | | |
| AAB AAG AWS CYN GFA GKD MWG RAS SER | 3.1% | | | | |
| OTHER | 44.9% | 5 | 15 | 20 | 41.7% |
| TOTAL | 100.0% | 13 | 35 | 48 | 100.0% |

FIG. 7

| OPTIONAL EQUIPMENT COMBINATIONS | #1 | #2 | #3 | #4 | #5 | #6 | #7 | #8 | #9 | #10 | #11 | #12 | TOTAL |
|---|---|---|---|---|---|---|---|---|---|---|---|---|---|
| AAB CYN GFA GKD RAS | 1 | 1 | 1 | 1 | 1 | 1 | 1 | | 1 | | 1 | | 9 |
| AAB CYS GFA GKD MWG RAS | | | | | | | | 1 | | 1 | | | 2 |
| AAB CYN GFA GKD MWG RAS | | | | | | | | | | | | 1 | 1 |
| AAB AWS CYN GFA GKD MWG RBN | | | | | | | | | | | | | |
| AAB AWS CYS GFA GKD MWG RAZ | | | | | | | | | | | | | |
| AAB AWS CYS GFA GKD MWG RBN | | | | | | | | | | | | | |
| AAB CYR GFA GKD RBN | | | | | | | | | | | | | |
| AAB AAG AWS CYN GFA GKD MWG RAS SER | | | | | | | | | | | | | |
| OTHER | | | | | | | | | | | | | |
| TOTAL | | | | | | | | | | | | | 12 |

| DLR | SLS | DIV | AVL | SLS_PCT | UNIT_W | DIV_PCT | AVL_WT | 1 |
|---|---|---|---|---|---|---|---|---|
| Dealer 1 | 19 | 23 | 17 | 15.08% | 6.632 | 14.84% | 112.59 | 1 |
| Dealer 2 | 37 | 44 | 41 | 29.37% | 3.405 | 28.39% | 139.34 | |
| Dealer 3 | 62 | 74 | 58 | 49.21% | 2.032 | 47.74% | 117.39 | |
| Dealer 4 | 8 | 14 | 8 | 6.35% | 15.750 | 9.03% | 125.91 | |
| | 126 | 155 | 124 | | | | 112.59 | |

FIG. 10

| DLR | SLS | DIV | AVL | SLS_PCT | UNIT_W | DIV_PCT | AVL_WT | | AVL_WT | |
|---|---|---|---|---|---|---|---|---|---|---|
| Dealer 1 | 19 | 23 | 17 | 15.08% | 6.632 | 14.84% | 112.59 | 1 | 119.22 | 2 |
| Dealer 2 | 37 | 44 | 41 | 29.37% | 3.405 | 28.39% | 139.34 | | 139.34 | |
| Dealer 3 | 62 | 74 | 58 | 49.21% | 2.032 | 47.74% | 117.39 | 1 | 117.39 | 1 |
| Dealer 4 | 8 | 14 | 8 | 6.35% | 15.750 | 9.03% | 125.91 | | 125.91 | |
| | 126 | 155 | 124 | | | | 112.59 | | 117.39 | |

FIG. 11

| DLR | SLS | DIV | AVL | SLS_PCT | UNIT_W | DIV_PCT | AVL_WT | 1 | 2 | 3 | 4 | 5 | 6 | 7 | 8 | 9 | 10 | 11 | AVL_WT | Total |
|---|---|---|---|---|---|---|---|---|---|---|---|---|---|---|---|---|---|---|---|---|
| Dealer 1 | 19 | 23 | 17 | 15.08% | 6.632 | 14.84% | 112.59 | 1 |   | 1 |   |   |   |   | 1 |   |   |   | 132.48 | 3 |
| Dealer 2 | 37 | 44 | 41 | 29.37% | 3.405 | 28.39% | 139.34 |   | 1 |   |   |   |   |   |   |   |   |   | 139.34 |   |
| Dealer 3 | 62 | 74 | 58 | 49.21% | 2.032 | 47.74% | 117.39 |   |   |   | 1 | 1 | 1 | 1 |   |   | 1 | 1 | 131.62 | 7 |
| Dealer 4 | 8 | 14 | 8 | 6.35% | 15.750 | 9.03% | 125.91 |   |   |   |   |   |   |   |   | 1 |   |   | 141.66 | 1 |
|   | 126 | 155 | 124 |   |   |   | 112.59 |   |   |   |   |   |   |   |   |   |   |   |   | 11 |

DEALER INVENTORY MANAGEMENT SYSTEM

BACKGROUND OF THE INVENTION

1. Field of the Invention

The present invention relates generally to a dealer inventory management system and, more particularly, to a computer-implemented system for recommending which types of vehicles a dealer should order from an automotive manufacturer.

2. Discussion

In the automotive industry, the manufacturer is primarily concerned with allocating its resources to produce those vehicles that can be sold to its retail dealers. Likewise, each retail dealer is interested in acquiring vehicles from the manufacturer which can be quickly sold to customers. Generally, manufacturers and their retail dealers spend considerable resources trying to forecast what types of vehicles and how many of each type of vehicle will be purchased by their customers. Forecasting vehicle sales for a retail dealer is often a manually intensive and time consuming process.

In those instances where an automated dealer inventory management system has been implemented, the forecasting process for an individual dealer typically only focuses on that dealer's own vehicle sales. As a result, the vehicle sales information may not be representative of the dealer's local market. In a metropolitan area, an individual dealer's sales may not reflect all of the vehicle sales made in that dealer's local market. In the case of a low volume dealer located in a rural area, the specific dealer's sales can be so small that the vehicle sales information gives an unreliable guide to that dealer's market. If the dealer is given access to vehicle sales information based upon vehicle sales made throughout an entire zone, that too can be misleading because the zone usually encompasses a large geographic area and thus the vehicle sales made throughout the zone may also not represent the types of vehicles sold in that dealer's local market.

Therefore, it would be desirable to provide a computer-implemented dealer inventory management system that would recommend to each dealer how they should order their retail vehicles. The recommendation should be formulated by analyzing a dealers availability and developing specific orders that drive availability towards that dealer's ideal sales mix. The ideal sales mix for a dealer is based on a sampling of vehicle sales made in the dealer's local market during a predefined sales period. Since the sampling method focuses only on fast-selling vehicles, including those made by other dealers in the same local market, the resultant ideal sales mix includes the best ordering practices of adjacent dealers as well as eliminates the poor practices of the ordering dealer. Lastly, the dealer inventory management system should account for material constraints when formulating order recommendations.

SUMMARY OF THE INVENTION

In accordance with the teachings of the present invention, a dealer inventory management system is provided for recommending which types of vehicles a dealer should order from the automotive manufacturer. The computer-implemented system includes a vehicle sales data structure for storing vehicle sales information, a dealer data structure for storing dealer information, and a vehicle availability data structure for storing which vehicles are available to each dealer. A market determination module accesses the vehicle sales and dealer data structures to determine an ideal sales mix of vehicles for each dealer based upon a sampling of vehicle sales made in the dealer's local market. A dealer assessment module then accesses the vehicle availability data structure to formulate a recommended order for each dealer by comparing the dealer's ideal sales mix to the mix of vehicles available to that dealer.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
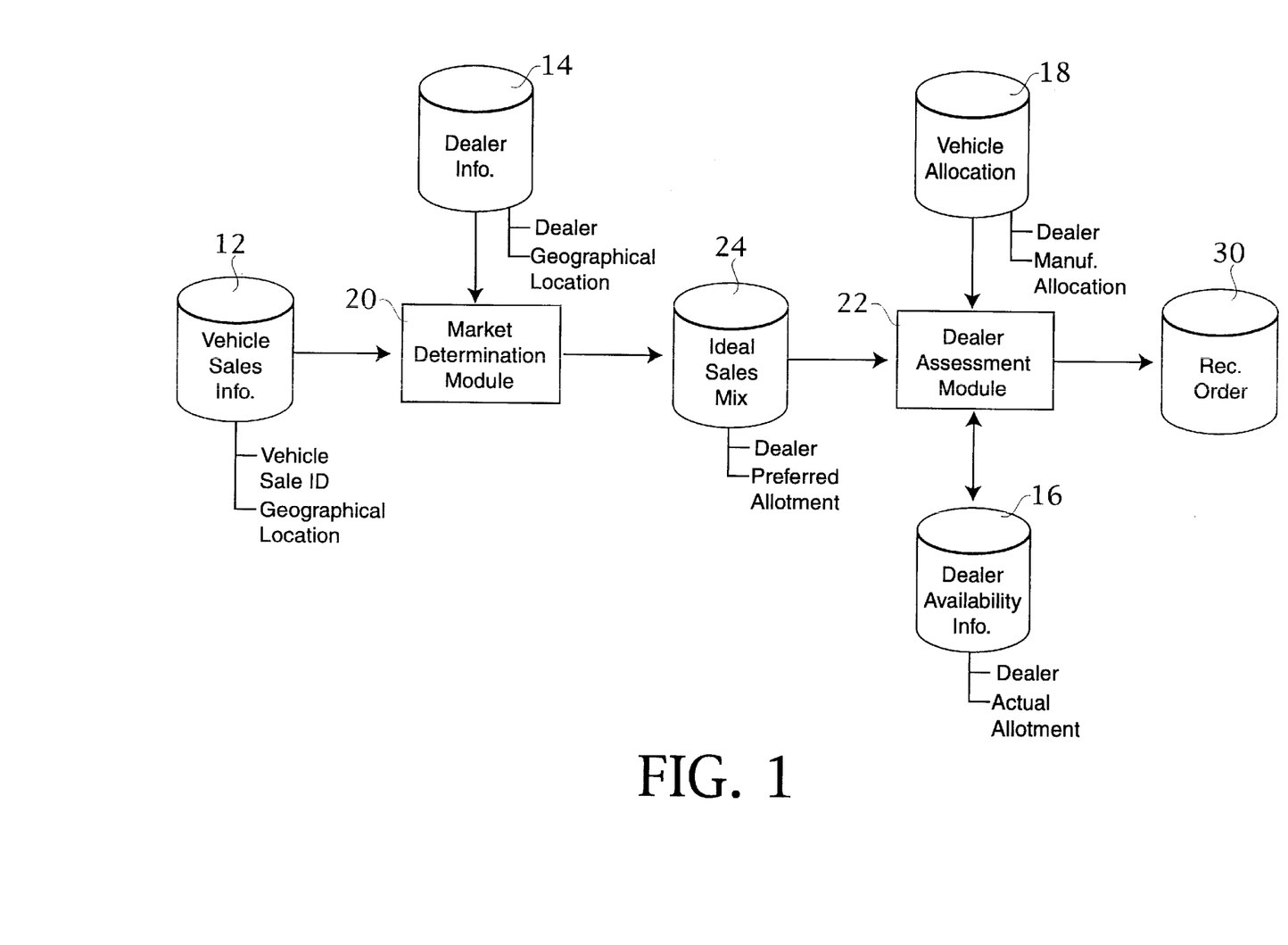
FIG. 1 is a block diagram showing the components of the dealer inventory management system of the present invention.

A computer-implemented dealer inventory management system 10 for recommending which types of vehicles a dealer should order from an automotive manufacturer is depicted in FIG. 1. The dealer inventory management system includes a vehicle sales data structure 12, a dealer data structure 14, a vehicle availability data structure 16, a vehicle allocation data structure 18, a market determination module 20 and a dealer assessment module 22.

Generally, the dealer inventory management system 10 begins by determining an ideal or preferred sales mix of vehicles for each dealer. The ideal sales mix for a dealer is based upon a sample of vehicles sales made in the dealers local market, irrespective of which dealer made the sale. An order recommendation is then formulated by comparing the ideal sales mix with a mix of vehicles actually available to the dealer. As will be more fully explained, the recommendation includes fully configured vehicles down to option packages, optional equipment, exterior paint color, etc.

Since the manufacturer typically employs an independent allocation process that determines which model types (i.e., Neon, Minivan, etc.) and how many of each model type a dealer can order, the preferred embodiment of the dealer inventory management system 10 develops an ideal sales mix for each model group. However, it is also envisioned that the ideal sales mix could be abstracted up a level to recommend which model types and how many of each model type a dealer should order.

As determined by the market determination module 20, the dealer's local market is defined by a sampling of vehicles sales made closest to the dealer during a predefined sales period (e.g., last 90 days). To identify the vehicle sales made closest to a dealer, the market determination module 20 accesses the vehicle sales data structure 12 and the dealer data structure 14. The vehicles sales data structure 12 contains information about vehicle sales that were made during the predefined sales period, including a geographic indicator for each sale. A zip code corresponding to the residence of the vehicle's purchaser may serve as the geographic indicator. Similarly, the dealer data structure contains information about each dealer, including a geographic indicator (i.e., zip code) for each dealer. By converting zip codes into latitude and longitude coordinates, the market determination module 20 can calculate a radial distance between a vehicle sale and a dealer. In this way, vehicle sales made closest to any particular dealer are captured within a circular geographic sampling area. To obtain a more representative sampling for a particular dealer, it is also envisioned that other shapes may be used for the geographic sampling area (e.g., defined in whole or in part by national, natural, jurisdictional, geo-demographical or other boundaries).

Figure 2:
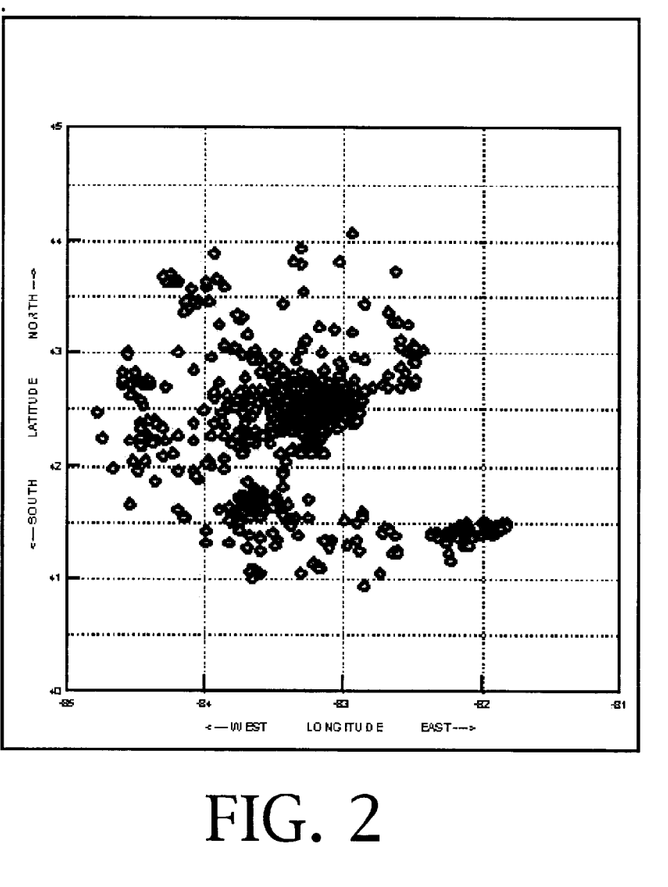
FIG. 2 is a diagram illustrating an exemplary distribution of vehicle sales made by a metropolitan dealership.

When defining a dealer's local market, the sample of vehicle sales should be representative of the types of vehicles sold in the dealer's area. Although the size of the sample (e.g., 1000 vehicles) may vary, it preferably remains constant from dealer to dealer. FIG. 2 illustrates an exemplary distribution of vehicle sales as determined for a dealer located in the metropolitan area. For a dealer located in a rural area, the distribution of vehicles sales for that dealer will typically cover a larger geographic area. As a result, the distance (e.g., radial) from the dealer to the vehicle sale will be larger to achieve an appropriate sample size for that dealer.

Figure 3A:
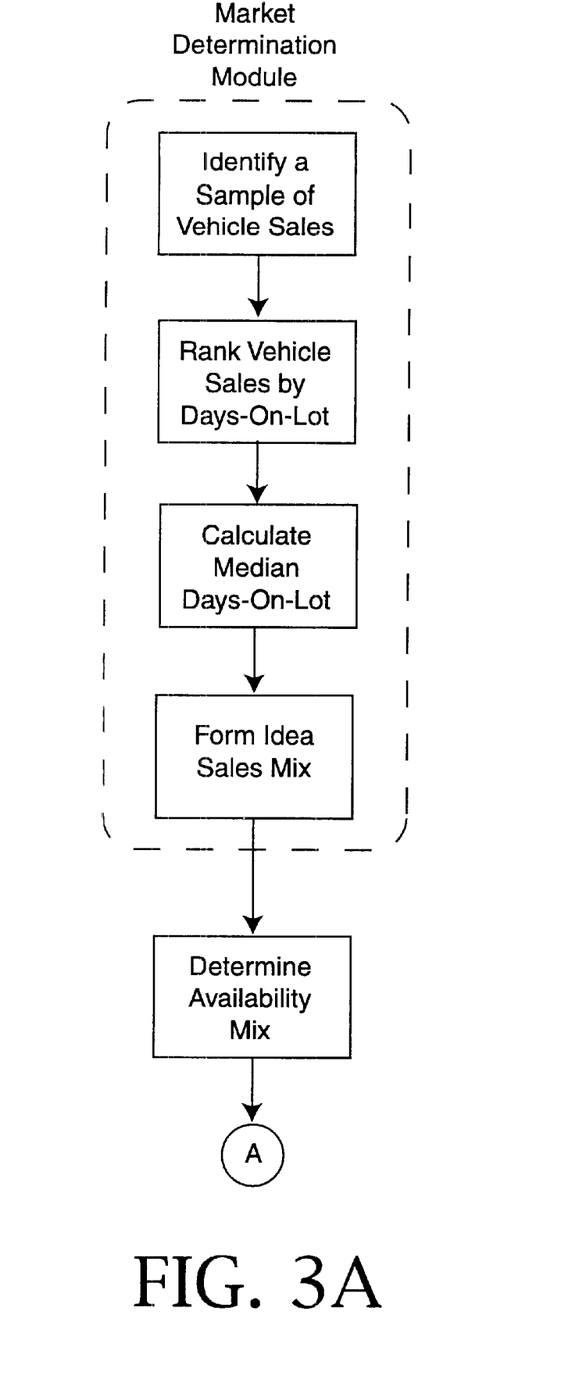
FIGS. 3a and 3b are detailed flow charts showing a preferred embodiment of a market determination module and a dealer assessment module, respectively, in accordance with the present invention.

Returning to FIG. 1, the market determination module 20 then forms the ideal sales mix from the vehicle sales in the sampling area. Each vehicle sale is ranked (in ascending order) based on the length of time it took for the vehicle to be sold. The number of days the vehicle was on the dealer's lot (i.e., days-on-lot) may be used for this purpose. Next, the median length of time it took for a vehicle sale to occur is calculated for the sample. Lastly, the ideal sales mix for the dealer is formed by eliminating those vehicles from the sample that took longer to sell than the median length of time. Alternatively, the ideal sales mix may be formed from those vehicles within a standard deviation from the median length of time. In either case, the resultant ideal sales mix represents the fastest-selling vehicles during the sales period in that dealer's local market. Moreover, it encapsulates the best ordering practices of adjacent dealers as well as eliminates the dealer's own poor ordering practices. When defining the ideal sales mix, it is also envisioned that the vehicle sales made in the last 30 days may be weighted more than vehicle sales made in the first 60 days of a 90 day sales period. The methodology associated with market determination module 20 is also illustrated in FIG. 3A.

Generally, the dealer assessment module 22 formulates a recommended order 30 by comparing a dealer's ideal sales mix 24 to the mix of vehicles available to that dealer. The vehicle availability data structure 16 provides the vehicles available to each dealer (herein referred to as their "availability mix"). The availability mix includes vehicles currently in-stock (i.e., on the dealers lot) as well as vehicles previously ordered and scheduled but not yet received by the dealer. As previously noted, each dealer's ideal sales mix is developed at the model type level. Therefore, the vehicle allocation data structure 18 contains an allocation of the number of vehicles within each model type that each dealer is permitted to order from the manufacturer, and thus serves as a starting point for the dealer assessment module 22. However, in order to recommend a fully-configured vehicle to the dealer, the dealer inventory management system 10 must also take into consideration customer preferred equipment packages, optional equipment, exterior paint color, etc., of the vehicles identified in the ideal sales mix 24.

Figure 4:
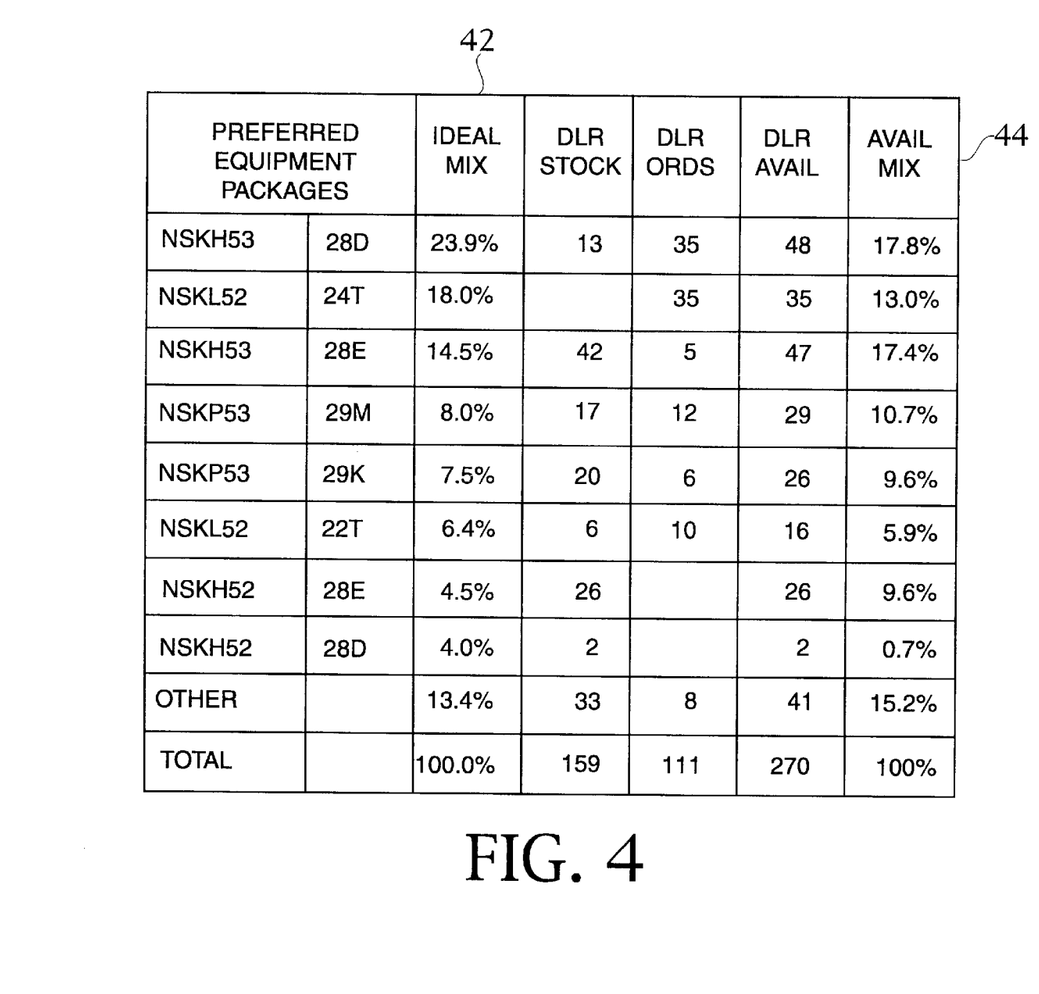
FIG. 4 is a chart showing the ideal sales mix and the availability mix for an exemplary dealer at the customer preferred equipment package level in accordance with the present invention.

Accordingly, the dealer assessment module 22 compares. (within each model type) how the vehicles available to the dealer are equipped in relation to the vehicles in the ideal sales mix 24. First, vehicles are grouped according to the available customer preferred equipment packages in both the ideal sales mix and the availability mix. FIG. 4 illustrates how the ideal sales mix 42 and the availability mix 44 for each customer preferred equipment package are represented as percentages of the total number of vehicles within the model type. Next, a variance 52 is calculated between the ideal sales mix 42 and the availability mix 44 for each customer preferred equipment package. The customer preferred equipment package having the greatest negative variance will be recommended to the dealer.

Figure 3B:
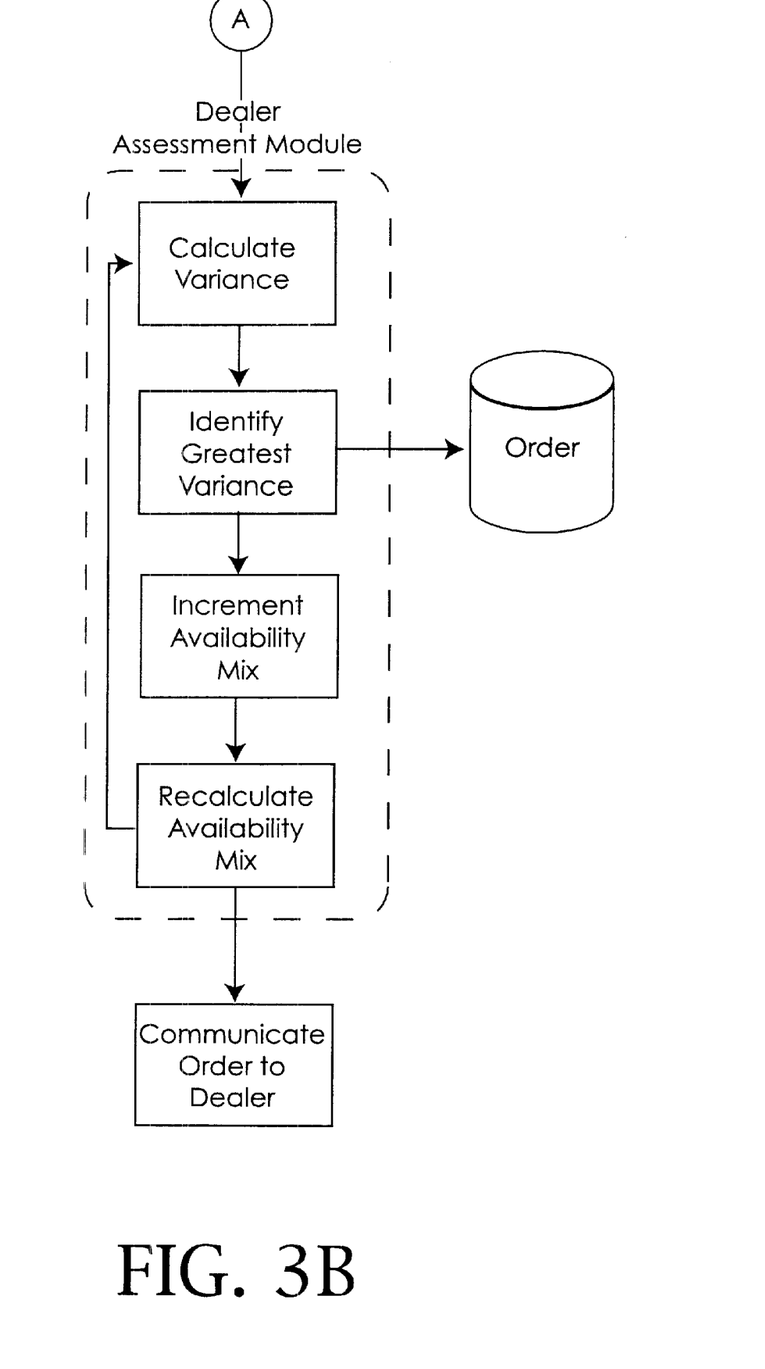
Figure 5:
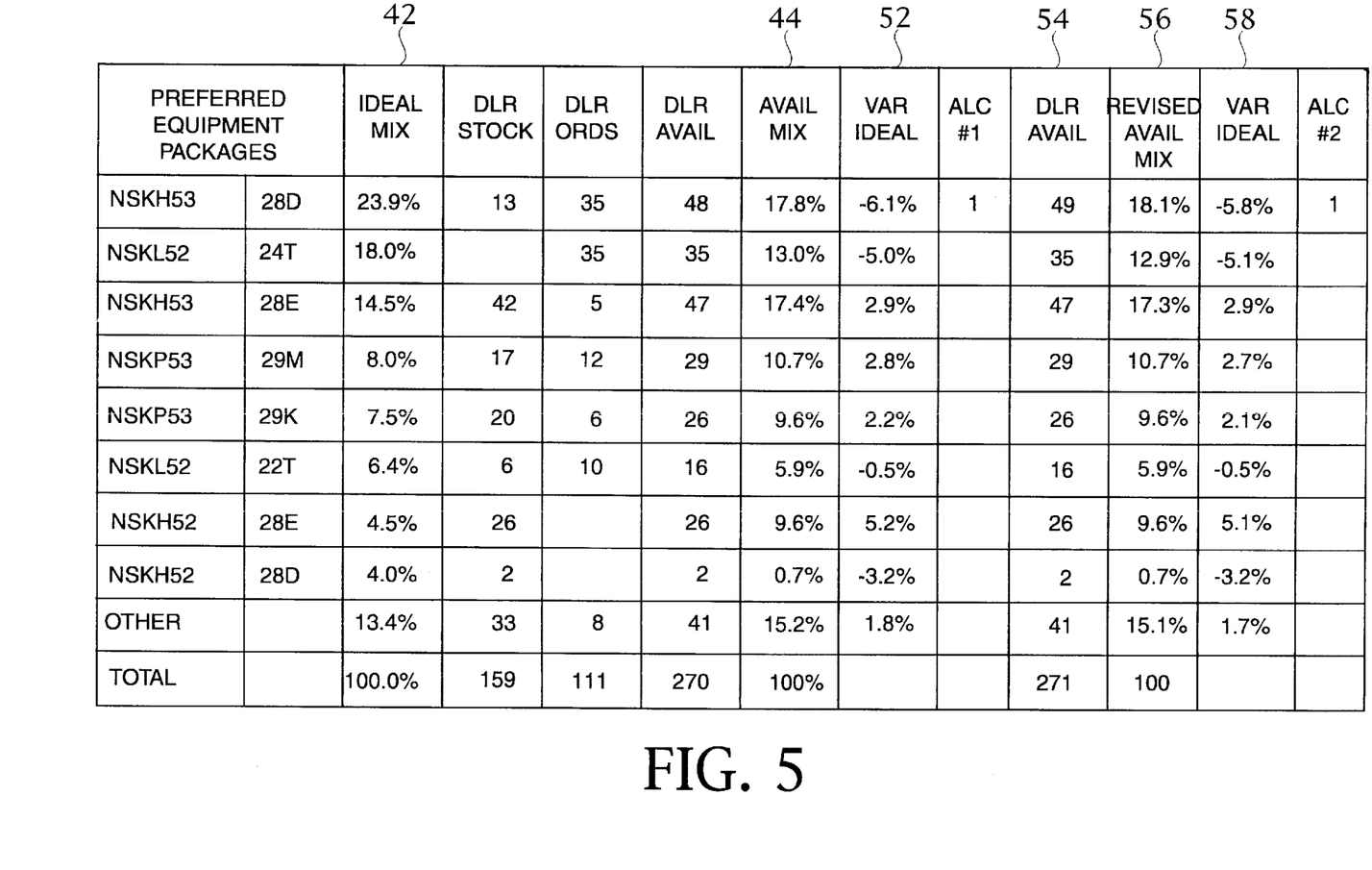
FIG. 5 is a chart showing how a recommendation is formulated based upon a comparison at the customer preferred equipment package level of the ideal sales mix with the availability mix in accordance with the present invention.
Figure 6:
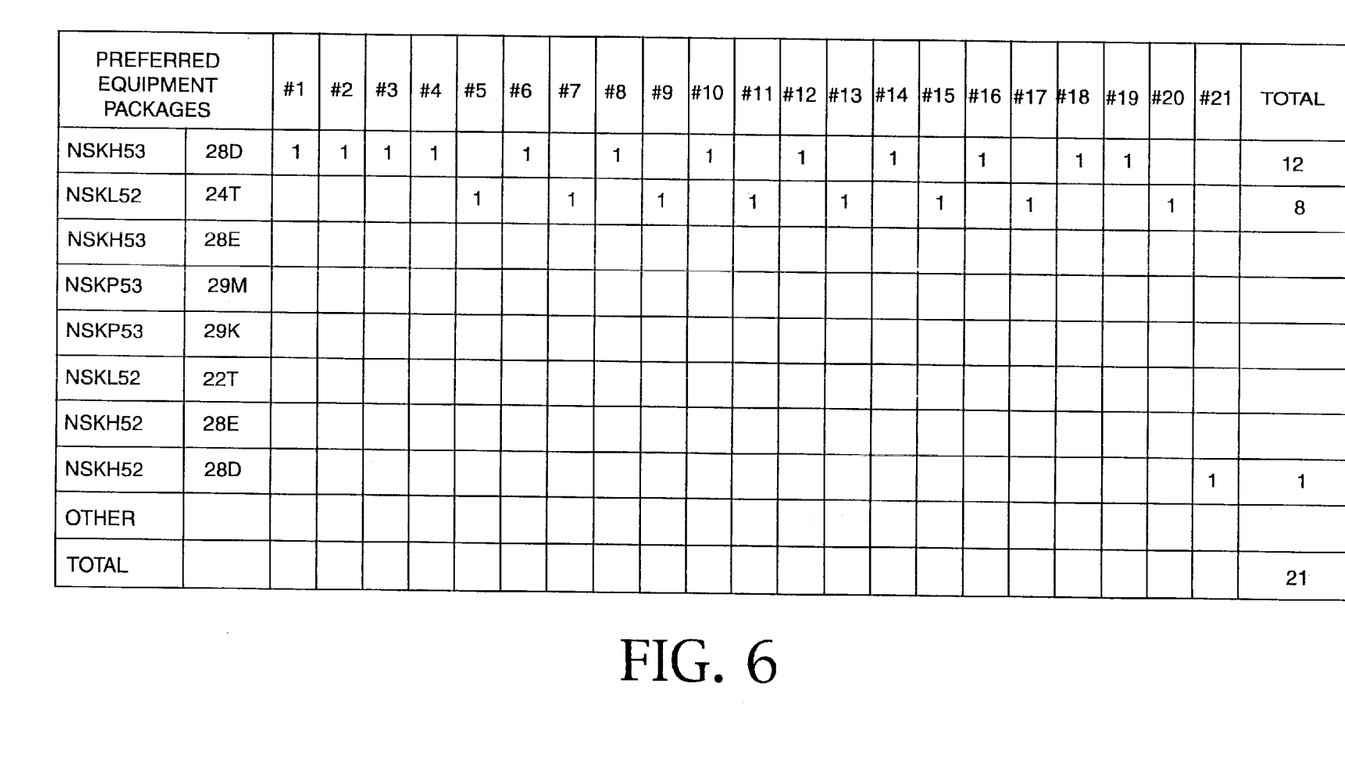
FIG. 6 is a chart showing how the allotment process is repeated for each of the previously allocated vehicles in a particular model type in accordance with the present invention.

To formulate another recommendation, the availability for the recommended customer preferred equipment package is incremented 54 and the availability mix 56 for each customer preferred equipment package is recalculated. Again, a variance 58 is calculated and the customer preferred equipment package having the greatest negative variance will be recommended to the dealer as shown in FIG. 5. In this example, the dealer is allocated twenty-one (21) vehicles of this model type by the manufacturer's allocation process. As shown in FIG. 6, the above-described method is repeated until at least twenty-one customer preferred equipment packages have been recommended for this model type. FIG. 3B also illustrates the methodology associated with market determination module 20.

Figure 7:
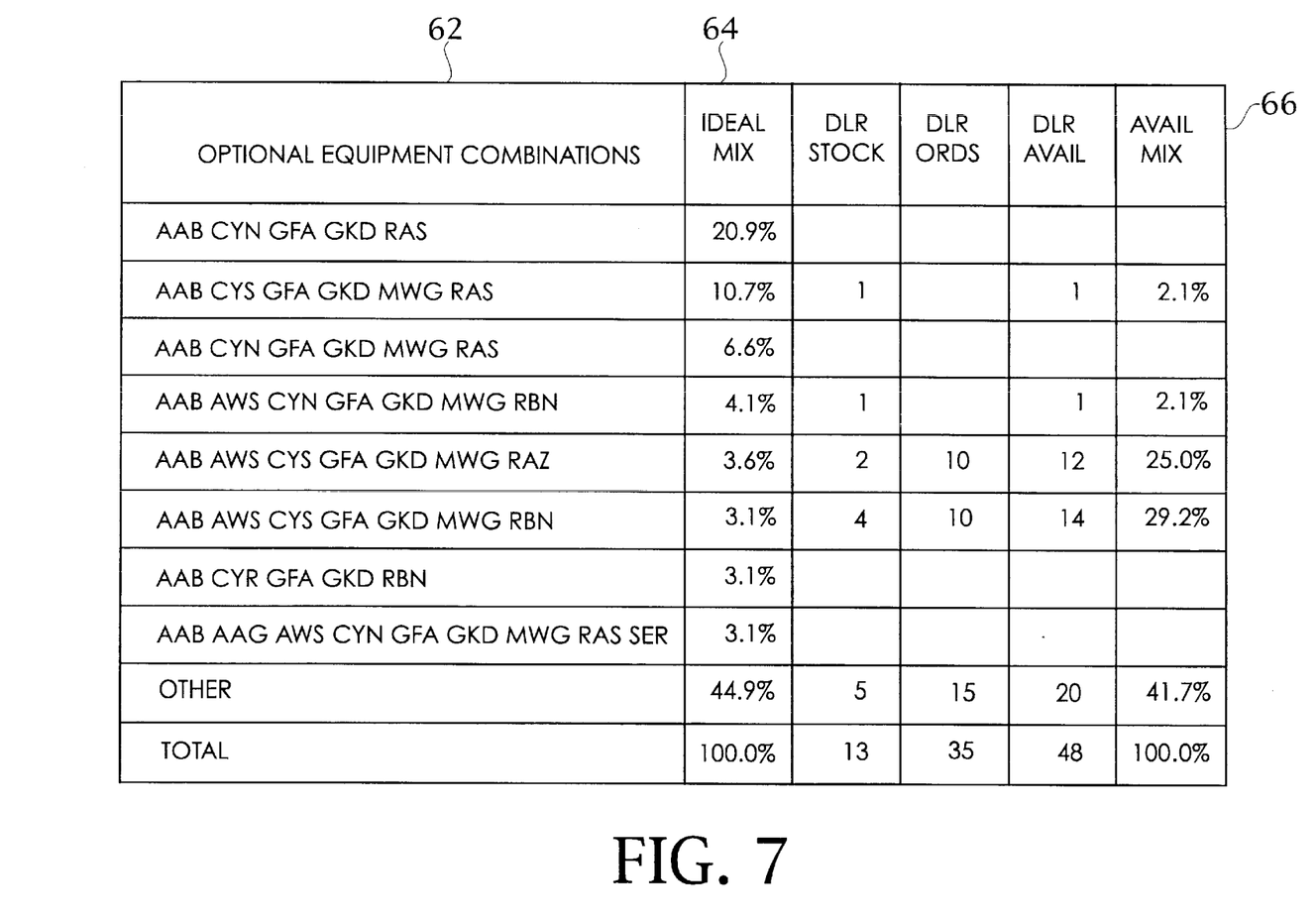
FIG. 7 is a chart showing the ideal sales mix and availability mix for an exemplary dealer at the optional equipment level in accordance with the present invention.
Figure 8:
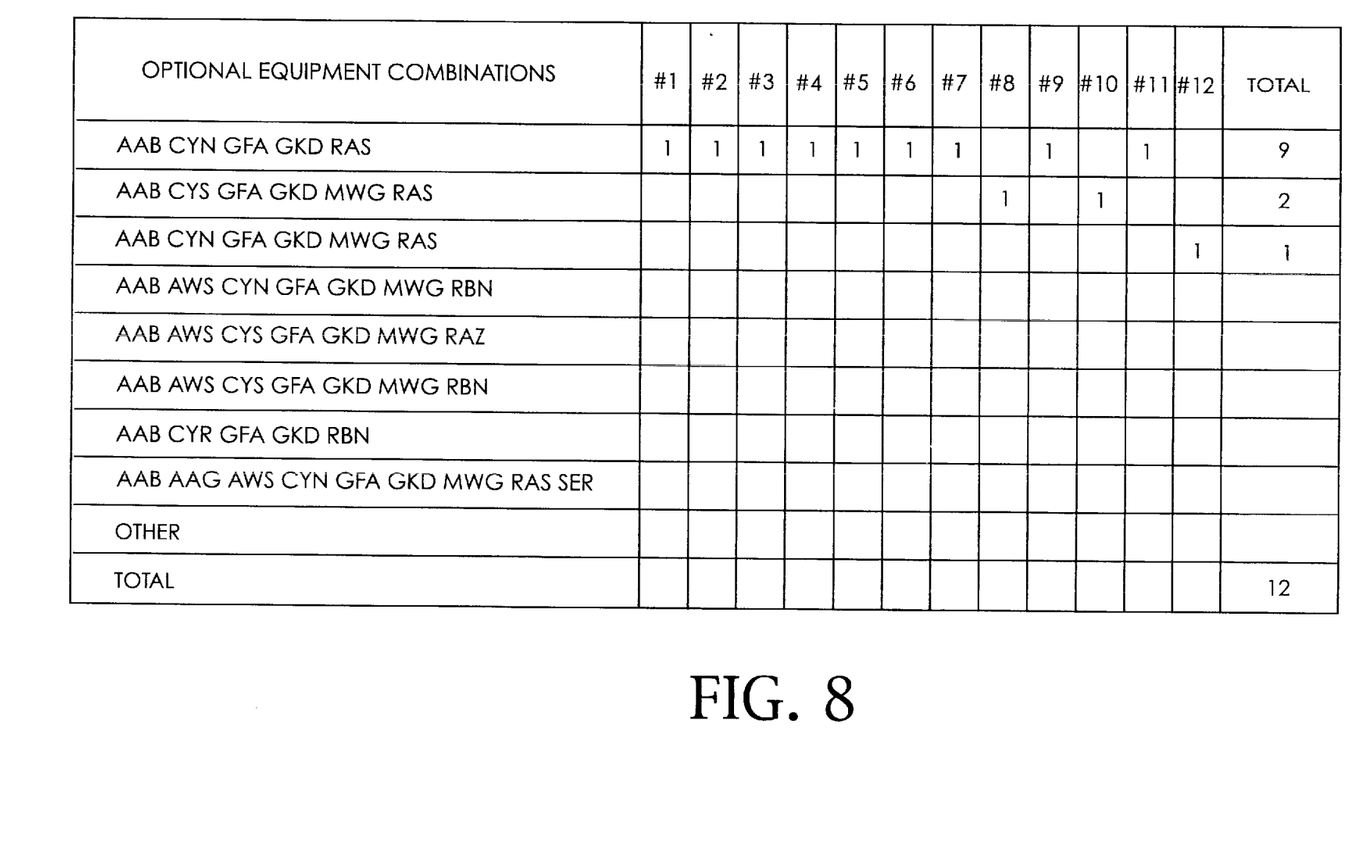
FIG. 8 is a chart illustrating how the allotment process is repeated for each of the previously allotted vehicles in a particular customer preferred equipment package in accordance with the present invention.

Next, the dealer assessment module 22 analyzes various optional equipment combinations for each customer preferred equipment package. For illustration purposes, the different optional equipment combinations 62 are shown in FIG. 7 for a particular customer preferred equipment package (e.g., NSKH53 28D). As previously discussed, the ideal sales mix 64 is compared to the availability mix 66 to formulate a recommendation as to which optional equipment combinations should be ordered with this customer preferred equipment package. Since twelve (12) vehicles with this type of customer preferred equipment package (i.e., NSKH53 28D) were previously recommended, the methodology is repeated twelve times as shown in FIG. 8. In addition, a similar analysis is performed for each customer preferred equipment package having previously been allotted a vehicle (i.e., NSKL52 24T and NSKH52 28D). Once the analysis is completed at the optional equipment level, the dealer assessment module 22 can further evaluate the exterior paint color, the exterior trim color, etc. to provide an order recommendation of fully-configured vehicles.

Lastly, the order recommendation is communicated to the dealer. In the preferred embodiment of the present invention, the order recommendation is presented to the dealer along with their weekly vehicle allocations. The dealer has the option to accept the entire recommendation or a portion of the recommendation, but cannot change the specific options associated with a recommended vehicle. The dealer can, however, continue to order vehicles in the customer way, outside of the dealer inventory management system.

The dealer inventory management system 10 can also account for material constraints when formulating order recommendations for the dealers. Material constraints and/or restrictions result from fluctuations in supply and demand. Supply constraints are caused by manufacturing and vendor problems and are typically more controllable than demand constraints which are primarily due to poor forecasts and market shifts.

Figure 9:
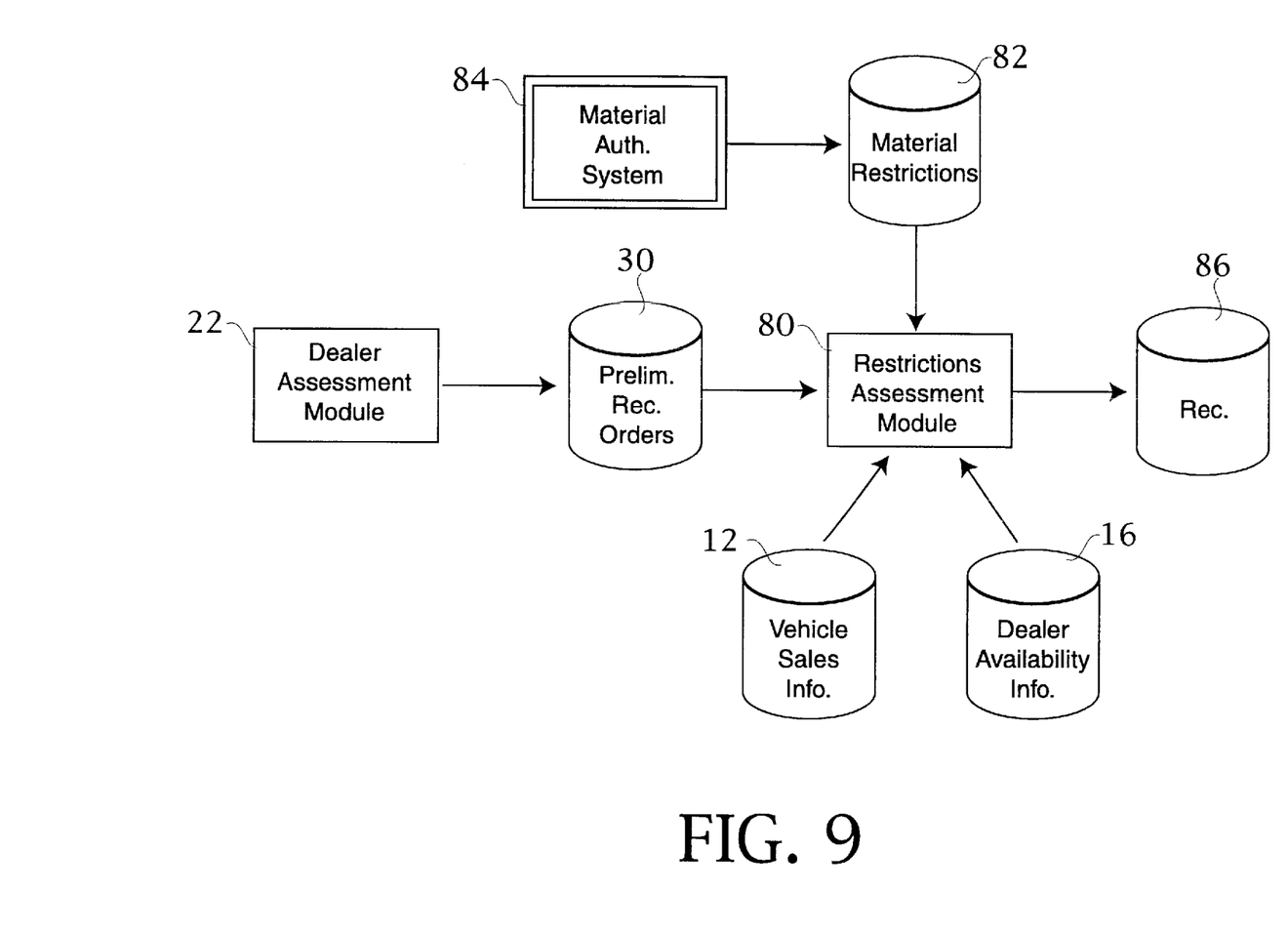
FIG. 9 is a block diagram showing the components of the material constraints assessment module in accordance with the present invention.

Generally, a constraints assessment module 80 assesses material constraints information in view of the preliminary order recommendations 30 received from the dealer assessment module 22 as shown in FIG. 9. The material constraints information is provided via a material constraints data structure 82 by an external material authorization system 84. When evaluating material constraints, the constraints assessment module 80 also relies on information from the vehicle sales data structure 12 and the vehicle availability datastructure 16. The external vehicle allocation system allocates vehicles to dealers based upon two determinants: (1) a reward for selling more units and (2) a handicap based on availability. Likewise, the constraints assessment module 80 recommends vehicles associated with a material constraint to the dealers having the greatest need, where need is defined by highest sales and lowest availability amongst all of the dealers.

Figure 10:
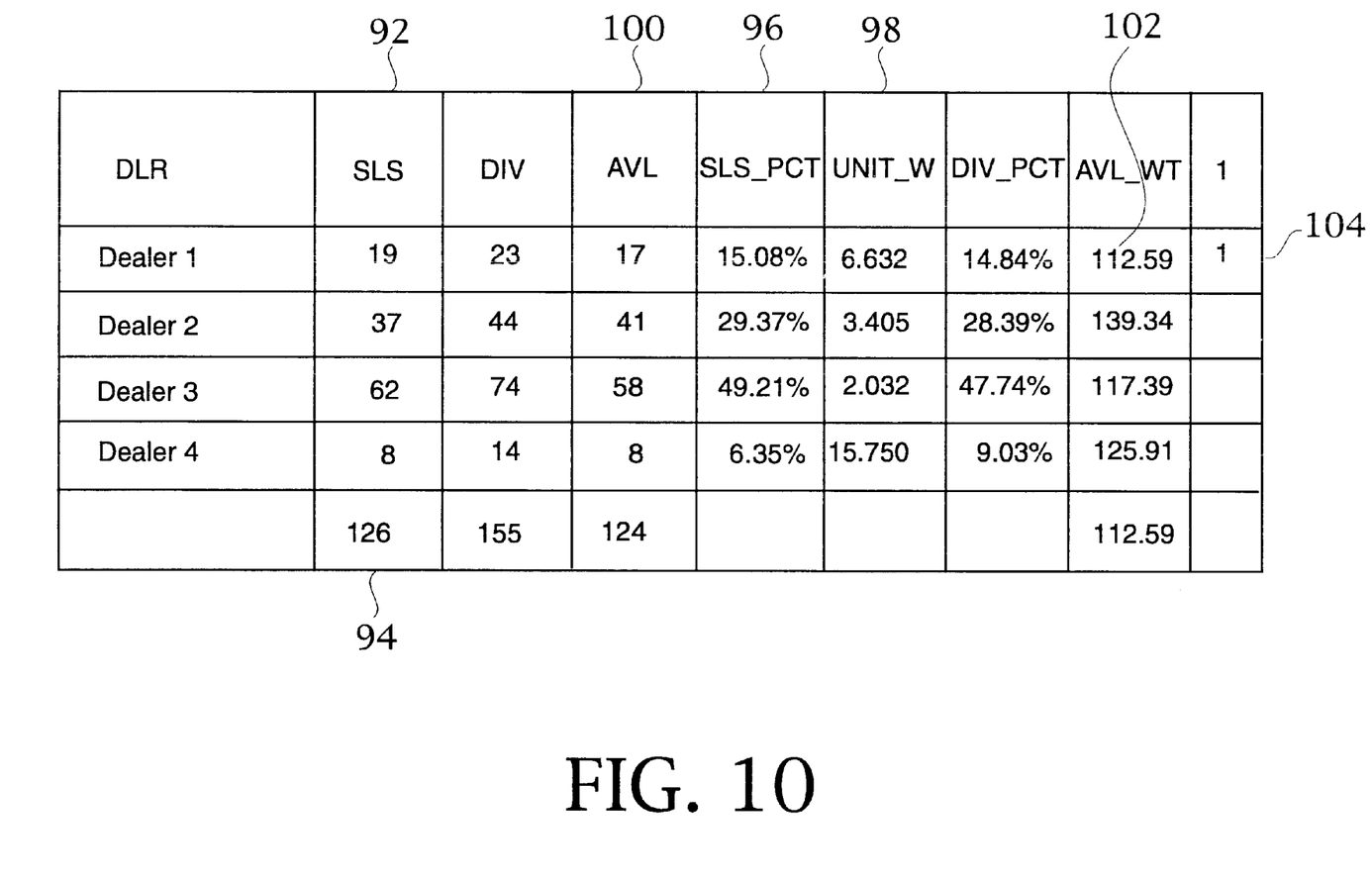
FIG. 10 is a chart showing how an availability weighting is determined for a group of exemplary dealers in accordance with the present invention.

A typical weekly allocation of minivans may be 11,000 units to 4,000 dealers. For illustration purposes, the following example is scaled down. Assume that the preliminary orders received from the dealer assessment module recommends 12 minivans amongst 4 dealers, but that a material constraint only permits 11 minivan orders. In this case, the "need" within the minivan model type is determined for each dealer as shown in FIG. 10. To determine the dealer with the highest sales, the number of sales 92 made by that dealer over a predefined sales period (e.g., 19 minivans sold within the last 90 days by the first dealer) is divided by the national sales 94 over the same sales period (e.g., 126 total minivan sales), thereby providing a dealer's percentage of the national sales 96 (e.g., 15.08% for the first dealer). The unit weight 98 is the reciprocal of the dealer's sales percentage, and thus represents the dealer's "reward" for selling more units.

Next, the unit weight 98 is multiplied by the number of minivans available 100 to that dealer, thereby determining a dealer's availability weighting 102. In this way, a dealer is "handicapped" if this type of vehicle is already available to them.

For example, the availability weight 102 for the first dealer was determined as follows:

Avail wt=(17 * 6.632)−0.148=112.59, where 0.148 is the dealer's division sales percentage Because many of the smaller dealers can have the same numbers for vehicle sales and vehicle availability, the dealer's division sales percentage or some other sales figure may be used as a tie-breaker between dealers. In this example, the first dealer has the lowest availability weighting (i.e., the greatest need) and, therefore, receives the first recommendation 104 for this type of vehicle.

Figure 11:
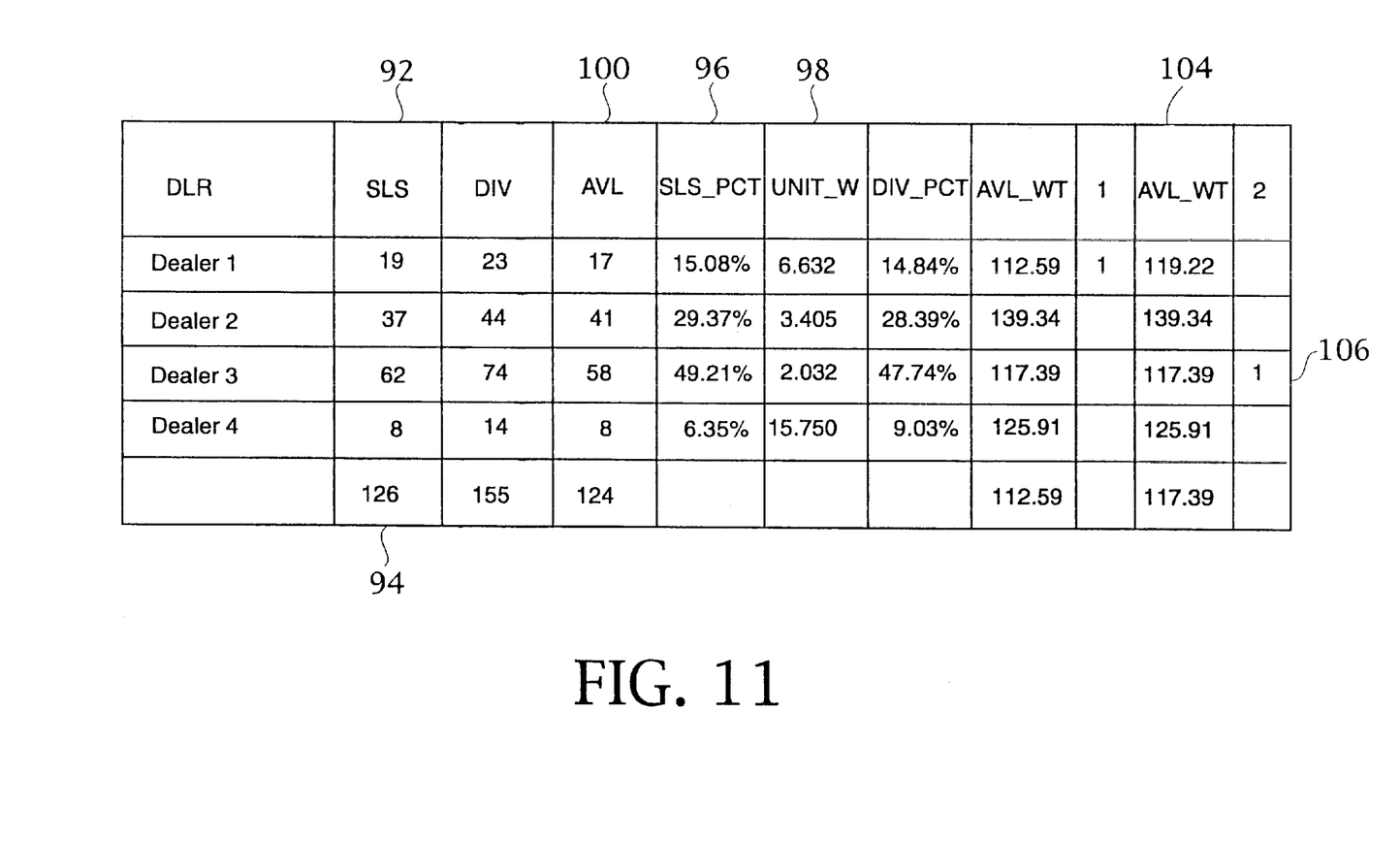
FIG. 11 is a chart showing how a recommendation is formulated in view of material constraint information in accordance with the present invention.
Figure 12:
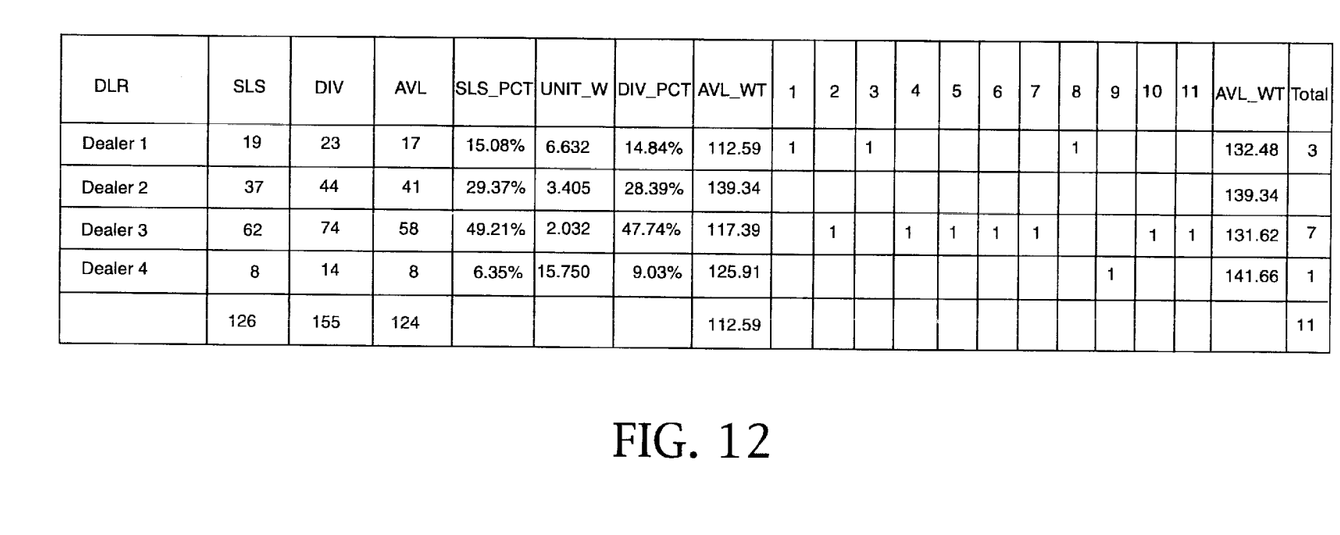
FIG. 12 is a chart showing how the material constraint assessment process is repeated up until an established limit of vehicle associated with a particular material constraint in accordance with the present invention.

Since the constraint allows for 11 minivans, this process continues iteratively until 11 minivans are recommended. To do so, the availability for the first dealer is incremented for the first minivan and the availability weighting 104 is recalculated for this dealer. The third dealer now has the lowest availability weighting 106 and thus receives the second minivan as shown in FIG. 11. When armed with a material constraint, the constraints assessment module 80 recommends restricted vehicles until the established limit of 11 is reached. The results from this iterative process are illustrated in FIG. 12.

Figure 13:
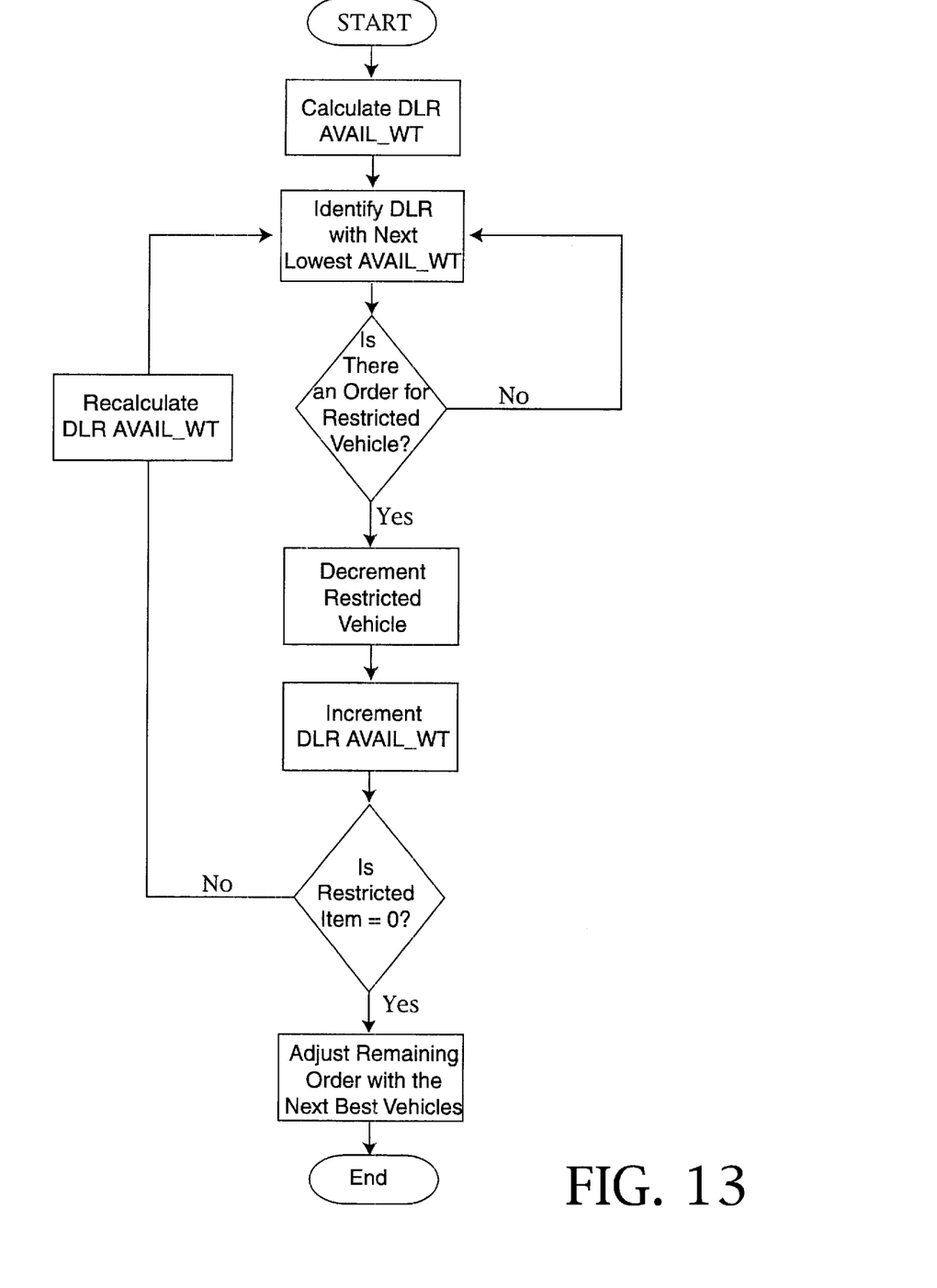
FIG. 13 is a detailed flow chart showing a preferred embodiment of a constraint assessment module in accordance with the present invention.

In the event that a material constraint prevents recommending a particular vehicle, the dealer assessment module 22 calculates additional vehicle recommendations for each dealer. Additional recommendations are preferably calculated equivalent to 50% of the allocation. For instance, a total of five vehicle recommendations are determined for a model type having an initial allocation of three vehicles. Since the additional recommendations are drawn from the ideal sales mix 24, they can be thought of as the "next best" vehicles for that particular dealer. When a material constraint prevents a particular dealer recommendation, the constraints assessment module 80 then uses the "next best" vehicle from these additional recommendations as a replacement for that restricted vehicle. Lastly, this material constraints assessment process is repeated for each material constraint received by the constraints assessment module 80. The methodology associated with the constraints assessment module 80 is illustrated in FIG. 13.

Each material constraint may be associated with one or more model types. If a material constraint is associated to only one model type (e.g., fifty 2.4 liter engines are available for Minivans), then the constraints assessment module 80 proceeds as previously discussed at the model type level. On the other hand, if a material constraint is associated with more than one model type (e.g., fifty 2.4 liter engines are available for Plymouth Breeze, Dodge Stratus and Minivans), then for each of these model types an availability weight is calculated for each dealer that sells that model type. Again, the constraints assessment module 80 performs the above-described analysis. One skilled in the art will readily recognize from such discussions that a material constraint may be for various types of vehicle equipment options (e.g., engine type, equipment packages, optional equipment, interior material color, exterior paint color, exterior trim color, etc.).

For purposes of this discussion, a material constraint means that orders will be accepted up to an established limit, whereas a material restriction means that no orders will be accepted for this type of vehicle. Prior to assessing material constraints, it is envisioned that the preliminary order recommendations 30 may also be evaluated by an external vehicle scheduling system (not shown). If so, each of the vehicles subject to a material restriction is flagged by the vehicle scheduling system and then subsequently replaced with the "next best" vehicle (as previously explained) by the constraints assessment module 80.

While the above description constitutes the preferred embodiment of the invention, it will be appreciated that the invention is susceptible to modification, variation, and change without departing from the proper scope or fair meaning of the accompanying claims.

We claim:

1. A computer-implemented method for recommending which types of vehicles a dealer should order from an automotive manufacturer, comprising the steps of:
   determining a preferred sales mix of vehicles for the dealer based on a plurality of vehicle sales made in the dealer's local market and the length of time that it took to make said plurality of vehicles sales;
   determining a mix of vehicles available to the dealer;
   calculating at least one variance between said preferred said mix and said mix of vehicles available to the dealer; and
   formulating a recommended order for the dealer based on said at least one variance.

2. The computer-implemented method of claim 1 wherein said preferred sales mix of vehicles being based on at least one vehicle sale made in the dealer's local market by a second dealer.

3. The computer-implemented method of claim 2 further comprising the step of:
   adjusting the recommended order for the dealer based on material constraints information.

4. The computer-implemented method of claim 1 wherein the step of determining a mix of vehicles available to the dealer further comprises defining said mix of available vehicles as vehicles previously ordered but not yet received and vehicles currently in-stock.

5. The computer-implemented method of claim 1 wherein the steps of calculating said at least one variance and formulating said recommended order for the dealer include the steps of:
   (a) calculating a variance between said preferred sales mix and said mix of vehicles available to the dealer for each type of vehicle in said preferred sales mix;
   (b) identifying a second type of vehicle having the largest negative. variance; and
   (c) recommending the dealer order said second type of vehicle.

6. The computer-implemented method of claim 5 further comprising the steps of:
   (d) adjusting said mix of vehicles available to the dealer for said type of vehicle to form an adjusted mix of vehicles available to the dealer;
   (e) calculating a variance between the vehicles in said preferred sales mix and the vehicles in said adjusted mix of vehicles available to the dealer for each type of vehicle in said preferred sale mix;
   (f) identifying a second type of vehicle having the largest variance; and
   (g) recommending the dealer order said type of vehicle.

7. A computer-implemented method for recommending which types of vehicles a dealer should order from an automotive manufacturer, comprising the steps of:
   determining a preferred sales mix of vehicles for the dealer based on a plurality of vehicle sales made in the dealer's local market by identifying said plurality of vehicle sales made in the dealer's local market, such that each vehicle sale from said plurality of vehicle sales having been made during a predefined sales period and within a geographic area near the dealer, calculating a median length of time it took to sell a vehicle in said plurality of vehicle sales, and forming the preferred sales mix of vehicles by eliminating those vehicles in said plurality of vehicle sales that took longer to sell than said median length of time;
   determining a mix of vehicles available to the dealer; and
   comparing said mix of vehicles available to the dealer with said preferred sales mix to formulate a recommended order for the dealer.

8. The computer-implemented method of claim 7 wherein the step of identifying said plurality of vehicle sales further comprises utilizing 1000 vehicle sales for said plurality of vehicle sales.

9. The computer-implemented method of claim 7 wherein the step of identifying said plurality of vehicle sales further comprises utilizing the last 90 days as said predefined sales period.

10. A computer-implemented method for recommending which types of vehicles a dealer should order from an automotive manufacturer, comprising the steps of:
    (a) determining a preferred sales mix of vehicles for the dealer based on a plurality of vehicle sales made in the dealer's local market;
    (b) determining a mix of vehicles available to the dealer;
    (c) for each model type of vehicle in said mix of vehicles available to the dealer and said preferred sales mix, grouping the vehicles in said mix of vehicles available to the dealer and said preferred sales mix according to available equipment, each grouping of vehicle defining a vehicle type;
    (d) calculating a variance between said preferred sales mix and said mix of vehicles available to the dealer for each type of vehicle;
    (e) identifying which type of vehicle has the largest negative variance; and
    (f) recommending the dealer order said type of vehicle identified in step (e).

11. The computer-implemented method of claim 10 further comprising the steps of:
    (g) adjusting said mix of vehicles available to the dealer to take into account the recommendation to the dealer to form an adjusted mix of vehicles available to the dealer;
    (h) calculating a variance between the vehicles in said preferred sales mix and the vehicles in said adjusted mix of vehicles available to the dealer for each type of vehicle;
    (i) identifying which type of vehicle among the types of vehicles for which variances were calculated in step (h) has the largest negative variance;
    (j) recommending the dealer order said type of vehicle identified in step (I).

12. The computer-implemented method of claim 11 further comprising the step of:
    performing steps (e)–(h) until the number of vehicles being recommended to the dealer is equal to a predetermined number of vehicles allocated by a manufacturer to the dealer.

* * * * *